United States Patent
Franosch et al.

(10) Patent No.: US 6,528,137 B2
(45) Date of Patent: *Mar. 4, 2003

(54) MULTILAYER PLASTIC PIPE HAVING A SEGMENTED BARRIER LAYER

(75) Inventors: Juergen Franosch, Marl (DE); Hans Ries, Marl (DE); Guido Schmitz, Dorsten (DE)

(73) Assignee: Degussa AG, Duesseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,714

(22) Filed: Oct. 14, 1997

(65) Prior Publication Data
US 2002/0006488 A1 Jan. 17, 2002

(30) Foreign Application Priority Data
Oct. 11, 1996 (DE) .......................... 196 41 946

(51) Int. Cl.⁷ ................... B29D 22/00; B29D 23/00; F16L 9/00; B32B 27/00
(52) U.S. Cl. ............... 428/36.9; 428/36.91; 428/36.92; 428/36.6; 428/36.7; 428/36.8; 138/177; 264/171.28
(58) Field of Search ................ 428/35.7, 36.1, 428/36.2, 36.6, 36.7, 36.8, 36.91, 36.9, 76, 36.92; 138/177; 264/171.26, 171.27, 173.16

(56) References Cited

U.S. PATENT DOCUMENTS

| | | | | |
|---|---|---|---|---|
| 3,825,036 A | * | 7/1974 | Stent ........................... | 138/174 |
| 5,284,184 A | | 2/1994 | Noone et al. ................ | 138/121 |
| 5,366,773 A | * | 11/1994 | Schroll et al. .............. | 428/36.9 |
| 5,460,771 A | | 10/1995 | Mitchell et al. ............. | 264/508 |
| 5,474,822 A | * | 12/1995 | Roeber et al. ............... | 428/36.91 |
| 5,500,263 A | * | 3/1996 | Roeber et al. ............... | 428/36.6 |
| 5,716,684 A | * | 2/1998 | Stoeppelmann et al. .. | 428/36.91 |
| 5,763,034 A | * | 6/1998 | Nishino et al. ........... | 428/36.91 |
| 5,798,048 A | * | 8/1998 | Ries .......................... | 210/767 |
| 5,858,492 A | * | 1/1999 | Roeber et al. ........... | 428/36.91 |

* cited by examiner

*Primary Examiner*—Harold Pyon
*Assistant Examiner*—Michael C. Miggins
(74) *Attorney, Agent, or Firm*—Oblon, Spivak, McClelland, Maier & Neustadt, P.C.

(57) ABSTRACT

A multilayer plastic pipe comprising at least three layers, which in turn comprise at least two different polymers, which are a polymer A (barrier layer polymer), which is a particularly good barrier against permeation of the medium to be carried through the pipes embedded in a polymer B (sheathing polymer) in the form of at least one layer which is interrupted at least once by a fillet of polymer B.

17 Claims, 1 Drawing Sheet

MULTILAYER PLASTIC PIPE HAVING A SEGMENTED BARRIER LAYER

BACKGROUND OF THE INVENTION

1. Field of the Invention

The present invention relates to a low-permeability, multilayer plastic pipe for carrying liquid or gaseous media.

2. Description of the Background

Multilayer plastic pipes having barrier properties with respect to the medium to be carried are known and are described in a large number of patent applications. However, the question which constantly arises is how sufficiently good adhesion can be produced between the polymer to be used for the barrier layer and the polymer which provides the mechanical properties? In particular when fluoropolymers, which are very good barriers with respect to fuels containing alcohols, are used, the problem is a large one which requires complex and, therefore, expensive chemical development work.

Attempts have also been made, for certain applications, to embed the barrier polymer in the carrier material in the form of impermeable sheet-like lamellae, which increase the diffusion path length and thus increase the barrier effect (JP-A-140 588/92, U.S. Pat. No. 4,410,482, German Offenlegungsschrift 43 15 177). However, production of the lamellae requires biaxial orientation, which does occur in blow molding, but not in pipe extrusion. Thus, biaxial orientation utilized in blow-molded tanks cannot be used in pipe extrusion, which only permits the production of fibrils which are unidirectionally oriented in the flow direction of the pipe and do not give the desired barrier effect.

It is also known that in pipes which have been provided with barrier layers by coextrusion, adhesion can become lost after relatively long contact with aggressive media. This is regarded as particularly critical if it is the inner layer which becomes detached, since under certain operating conditions a detached inner layer can partially constrict the pipe cross section in an unacceptable manner and so impair function.

Attempts have, therefore, been made to connect the barrier layer and the outer sheathing by means of mechanical locking (U.S. Pat. No. 5,437,311; DE 42 38 696). However, the tooling necessary for this is difficult to produce and unreliable in operation. In addition, the undercuts which are created function as notches and cause failure of the pipe under sudden load. A need, therefore, continues to exist for improvement in the bonding of a barrier layer polymer to a sheathing polymer in the construction of a multilayer pipe.

SUMMARY OF THE INVENTION

Accordingly, one object of the present invention is to provide improved bonding between the barrier layer and the other layers of a multilayer pipe which avoids the disadvantages described.

Briefly, this object and other objects of the present invention as hereinafter will become more readily apparent can be attained by a multilayer plastic pipe comprising at least three layers comprised of at least two different polymers, of a polymer A (barrier layer polymer), which is a particularly good barrier against permeation of the medium to be carried, embedded in a polymer B (sheathing polymer) in the form of at least one layer which is interrupted at least once by a fillet of polymer B.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
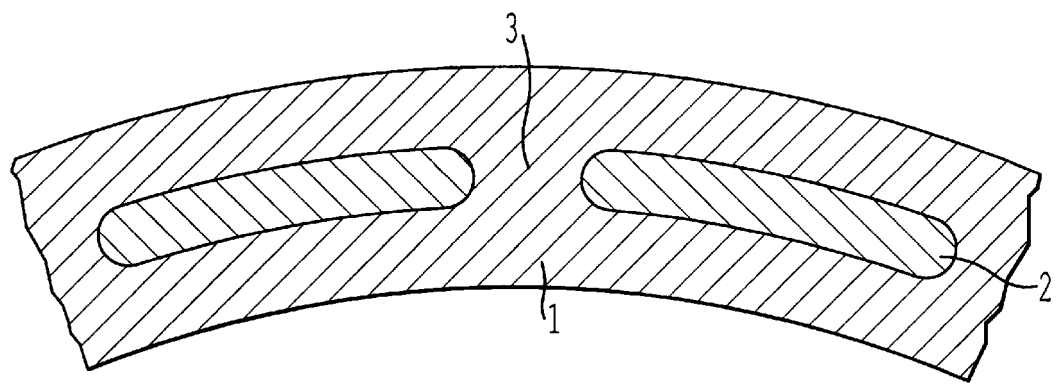
FIG. 1 is an embodiment of the invention in which fillets (3) are positioned in the sheathing layer of polymer (B)

In the invention, a barrier layer divided into a plurality of segments is embedded in a sheathing polymer. Each of the outer and inner layers of the sheathing polymer is connected to each other via fillets which interrupt the barrier layer, as shown in FIG. 1. The fillets are preferably aligned in the axial direction of the pipe, but a layout of the fillets in, for example, the shape of a spiral running around the pipe also falls within the scope of the invention.

The terms "polymer A" and "polymer B" here also include molding compounds based on these polymers, which polymers, of course, can also be copolymers, terpolymers and the like. The molding compounds can contain, besides the base polymer, conventional additives known to the prior art, such as stabilizers, processing aids, plasticizers, flame retardants, viscosity improvers, fillers, reinforcing agents, antistatic agents, pigments or other polymers. The fillers and reinforcing agents can also be electrically conductive.

In the simplest embodiment (see FIG. 1) a single barrier layer of polymer A (2) is embedded in a sheathing layer of polymer B (1), giving a B/A/B arrangement of the layers. Since the proportion of the fillets (3) around the circumference is, in total, small in relation to the proportion of the barrier layer, there is only a small reduction in the barrier effect in comparison with an unbroken barrier layer.

In another embodiment, two barrier layers made from one barrier layer polymer or alternatively different barrier layer polymers are arranged in sequence so that they are separated by an intervening layer of the sheathing polymer, resulting in an arrangement of the layers B/A/B/A/B or B/A/B/C/B. It is advantageous here if the fillets are offset with respect to one another, for instance by half the length of a segment, in order to maximize the diffusion path length. Furthermore, corresponding embodiments having more than two barrier layers are possible.

Figure 2:
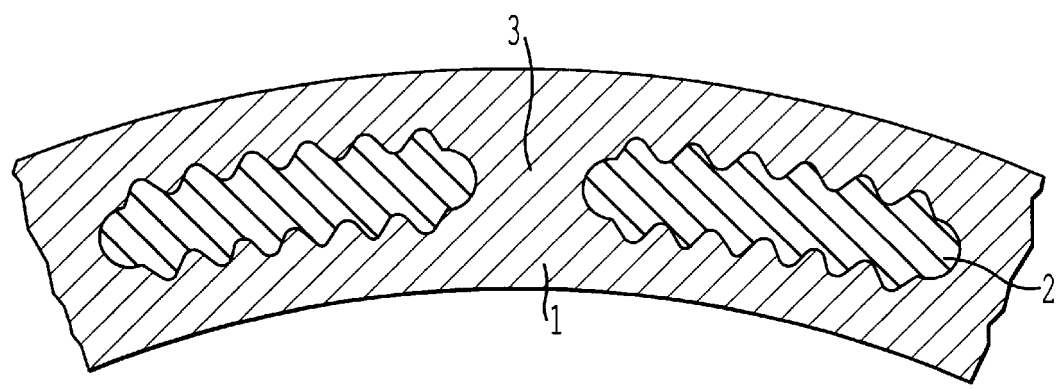
FIG. 2 is a variant of the embodiment shown in FIG. 1.

The interface between barrier layer and sheathing layer can be structured so as to transmit tangential stresses through positive connection as in the example shown in FIG. 2. Again, the barrier layer of polymer (A) is shown as (2) in which is embedded sheathing polymer (B) (1) in an arrangement which provides fillets (3).

In order to avoid unacceptable deterioration in mechanical properties, such as, for example, bursting pressure or impact strength, the thickness of the barrier layers should be less than 50% of the total wall thickness, preferably less than 30% of the total wall thickness. Similarly, the area of the fillets should be significantly smaller than the area of the barrier layer; the fillets should preferably make up a proportion of the circumference of a layer which is less than 20% of its total circumference.

Within a particular layer, the segments of an interrupted barrier layer can have the same or differing arc lengths. Similarly, the fillets can have the same or differing widths. Furthermore, the arc length of a segment and the width of a fillet can be constant along the length of the pipe, or can vary.

In addition it is possible either to employ barrier layer polymers which are compatible with the respective sheathing polymer or those which are incompatible. This is a significant advantage of the present invention, since complex modification of materials is not necessarily required and, therefore, virtually any material combination suited to the application can be used.

The pipe of the invention can also comprise two different sheathing layers, compatible with one another or bonded to one another via an adhesion promoter, in each of which at least one segmented barrier layer can be embedded. The barrier layer polymers embedded in the various sheathing layers can be of the same material or can differ. Thus, for example, the following arrangements of layers are conceivable:

B/A/B/D/A/D
B/A/B/AP/D
B/A/B/AP/D/A/D
B/A/B/D/C/D
B/A/B/AP/D/C/D
B/A/B/A/B/D/A/D
B/A/B/A/B/D/C/D/C/D where
  B, D=sheathing polymers
  A, C=barrier layer polymers
  AP=adhesion promoter.

Antistatic properties can also be imparted to the present pipe, which characteristic is particularly advisable when flammable substances are to be transported. Suitable methods of imparting antistatic properties are known in the art. For example, the sheathing layer B can contain an electrically conductive additive. On practical grounds and in order to save materials, however, it is recommended that a thin electrically conductive internal layer is provided, as disclosed in DE 40 25 301. The material of the internal layer should be chosen so as to provide a physical bond to the next layer. A further possibility is to impart electrically conductive properties to the barrier layer or to one of the barrier layers.

Conductive additives which can be used are, for example, carbon black, metal flakes, metal powder, metallized glass beads, metallized glass fibers, metal fibers (e.g. of stainless steel), metallized whiskers, carbon fibers (metallized or unmetallized), intrinsically conductive polymers or, particularly advantageously, graphite fibrils. Mixtures of different conductive additives can also be employed.

Graphite fibrils are described, for example, in Plastics World, November 1993, page 10 ff. These are tiny fibers of crystalline graphite. The material which is currently available commercially has a mean fiber diameter in the order of 0.01 micron and an UD ratio in the order of from 500-1 to 1,000, 1. Graphite fibrils as described in WO Application Nos. 8603455, 8707559, 8907163, 9007023 and 9014221 and in JP-A-03287821 are also suitable in principle for the purpose of the present invention.

The content of graphite fibrils in the molding compound generally ranges from 1 to 30% by weight, preferably from 1.5 to 10% by weight and particularly preferably from 2 to 7% by weight.

The mechanical properties of the present pipes are mainly determined by the material of the sheathing layer(s), so that recourse can be made to experience with the relevant monopipes. The choice of material depends on the particular application, so that no generally applicable recommendations can be made. For application in the automotive field, which is mentioned here as an example, high elongation at break, good thermoformability and high impact strength, especially at low temperatures, are required.

In general, suitable materials for the sheathing layer are polyamides, polyolefins or polyketones. Polyketones are alternating copolymers of carbon monoxide and a-olefins, as described, for example, in A. Wakker et al., Kunststoffe 86 (1995) 8, in EP-A-0 121 965 and EP-A-0 181 014.

Materials which can be used for the barrier layer include, for example, aromatic polyamides, such as PA 6,3T and PA MXD6, thermoplastic polyesters, such as, for example, polybutylene terephthalate, polyethylene terephthalate, polybutylene naphthalate and polyethylene naphthalate, fluoropolymers, such as polyvinylidene fluoride (PVDF), ethylene copolymers (ETFE), tetrafluoroethylene-hexafluoropropene-vinylidene fluoride terpolymers (THV) and ethylene-chlorotrifluoroethylene copolymers (ECTFE), ethylene-vinyl alcohol copolymers (EVOH), polyolefins, polyketones and polyacetals. The use of polymers of these types in multilayer plastic pipes is known.

Furthermore, the novel pipes may additionally contain an outer layer of an elastomer, such as, for example, ethylene-propylene rubber (EPM), ethylene-propylene diene rubber (EPDM), hydrogenated styrene-butadiene-styrene block copolymers (SEBS) or polyether ester amides. For better adhesion to a polar sheathing polymer, EPM, EPDM and SEBS may also be functionalized using an unsaturated carboxylic acid or a derivative thereof such as, for example, using maleic anhydride. Such composites are described, for example, in EP-A-0 344 427.

Table 1 shows, for illustration, some possible material combinations.

TABLE 1

| Type | Construction (from outside to inside) | Barrier layer material |
|---|---|---|
| B/A/B | PA12/PBT/PA12 | PBT |
|  | PA12/PVDF/PA12 | PVDF |
| B/A/B/D | PA12/PBT/PA12/PA12 conductive | PBT |
| B/AP/D/A/D | PA12/AP/PA6/EVOH/PA6[a] | EVOH |
| B/A/B/A/B | PA12/PVDF/PA12/PVDF/PA12 | PVDF |
| B/A/B/C/B | PA12/PVDF/PA12/PBT/PA12 | PVDF; PBT |
| B/A/B/AP/D/C/D | PA12/PVDF/PA12/AP/PA6/EVOH/PA6[a] | PVDF; EVOH |

[a]AP = adhesion promoter

The present pipes may, depending on the application, be either smooth or corrugated (U.S. Pat. No. 5,460,771). In a further embodiment, a pipe of this type comprises both smooth and corrugated sections (U.S. Pat. No. 5,284,184).

The present pipes are preferably produced by coextrusion, the segmentation being achieved by specific design of the tool parts which produce the barrier layers.

Considering, for example, the simplest construction which is B/A/B, the two sheathing layers are produced separately from one another. The tooling technology for this is sufficiently well-known in mono- and coextrusion. There are a number of production options. On the one hand, the barrier layer polymer A can be divided into a plurality of melt streams, each melt stream feeding one segment. Confluence of the melt streams is prevented by flow obstructions. On the other hand, the barrier layer polymer A can first be distributed into an annular melt stream, which is subsequently divided into a plurality of segments by flow obstructions. In both versions, the tool design is such that when the melt streams of sheathing material B and barrier layer material A merge, the fillets between the barrier layer melt streams are filled by sheathing material B, so that there can be no confluence of barrier layer material.

In another embodiment, in place of the flow obstructions, the melt streams of sheathing material B which form the fillets are fed in separately from the start.

In still another embodiment, the barrier layer material can be injected at a plurality of positions around the circumference (corresponding to the number of segments) into the center of the annular melt stream. This material then forms the barrier layer within the sheathing material.

It is then possible, by merging together a plurality of 3-layer melt streams prepared in this way, to obtain composites having a plurality of barrier layers and having fillets offset with respect to one another.

Pipes according to the invention can also be produced in a multistage process using a crosshead die.

The present pipes have a wide variety of applications, for example as fuel lines, tank fill pipes, vapor lines (i.e. lines carrying fuel vapors, e.g. venting lines) and as gas station lines.

Obviously, numerous modifications and variations of the present invention are possible in light of the above teachings. It is, therefore, to be understood that within the scope of the appended claims, the invention may be practiced otherwise than as specifically described herein.

What is claimed as new and is desired to be secured by Letters Patent of the United States is:

1. A plastic pipe, comprising:
   a circumferential structure, in the circumferential structure, at least one structure of elongated segments of polymer (A) prepared from a polymeric material selected from the group consisting of aromatic polyamide, a thermoplastic polyester, a fluoropolymer, ethylene/vinyl alcohol copolymer, a polyolefin, a polyketone and a polyacetal, said segments exhibit a barrier effect against permeation of a fluid medium which is carried through the pipe, the arc lengths of the segments being greater than widths of the segments and arc lengths of the segments being the same or different, embedded in a matrix of sheathing polymer (B) prepared from a polymer material selected from the group consisting of polyamides, polyolefins and polyketones, which segments are spaced apart from each other by intervening fillets of sheathing polymer (B), wherein the thickness of each barrier segment is less than 50% of the total wall thickness.

2. The plastic pipe of claim 1, wherein, in the circumferential structure of the pipe, at least two barrier regions are provided of segments of polymer A embedded in the matrix of sheathing polymer (B), the segments being arranged in sequence and formed of the same polymer so that they are separated by an intervening layer of sheathing polymer B.

3. The plastic pipe as claimed in claim 2, wherein said fillets are offset with respect to each other.

4. The plastic pipe of claim 1, wherein, in the circumferential structure of the pipe, at least two barrier regions are provided of segments of polymer A embedded in the matrix of sheathing polymer (B), the segments being arranged in sequence and formed of different polymers so that they are separated by an intervening layer of sheathing polymer B.

5. The multilayer plastic pipe as claimed in claim 4, wherein the fillets are offset with respect to each other.

6. The plastic pipe as claimed in claim 1, wherein the segments of polymer (A) have the same arc length.

7. The plastic pipe as claimed in claim 1, comprising two different sheathing layers, compatible with one another or bonded to one another by an adhesion promoter, wherein each of said sheathing layers contains at least one segmented barrier layer embedded therein.

8. The plastic pipe as claimed in claim 1, wherein the pipe has antistatic properties.

9. The plastic pipe as claimed in claim 1, wherein the pipe further comprises an outer layer of an elastomer.

10. The plastic pipe as claimed in claim 9, wherein said elastomer is ethylene-propylene rubber, ethylene-propylene-diene rubber, hydrogenated styrene-butadiene-styrene block copolymer or a polyether ester amide.

11. The plastic pipe as claimed in claim 1, wherein the pipe is a corrugated pipe.

12. The plastic pipe as claimed in claim 1, wherein the pipe comprises both smooth and corrugated sections.

13. A method of transporting fuel, comprising:
   transporting said fuel in a fuel line formed of the plastic pipe of claim 1.

14. A method of filling a tank, comprising:
   filling said tank through a full pipe formed of the plastic pipe of claim 1.

15. A method of transporting vapor, comprising:
   transporting vapor through the plastic pipe of claim 1.

16. A method of transporting fuel at a fuel storage site, comprising:
   transforming fuel in fuel lines formed of the plastic pipe of claim 1 the storage site.

17. The plastic pipe of claim 1, wherein said thermoplastic polyester is polybutylene terephthalate, polyethylene terephthalate, polybutylene naphthalate or polyethylene naphthalate and said fluoropolymer is polyvinylidene fluoride, ethylene/trifluoroethylene copolymer, tetrafluoroethylene/hexafluoropropene/vinylidene fluoride terpolymer or ethylene/chlorotrifluoroethylene copolymer.

* * * * *